Figure 1:
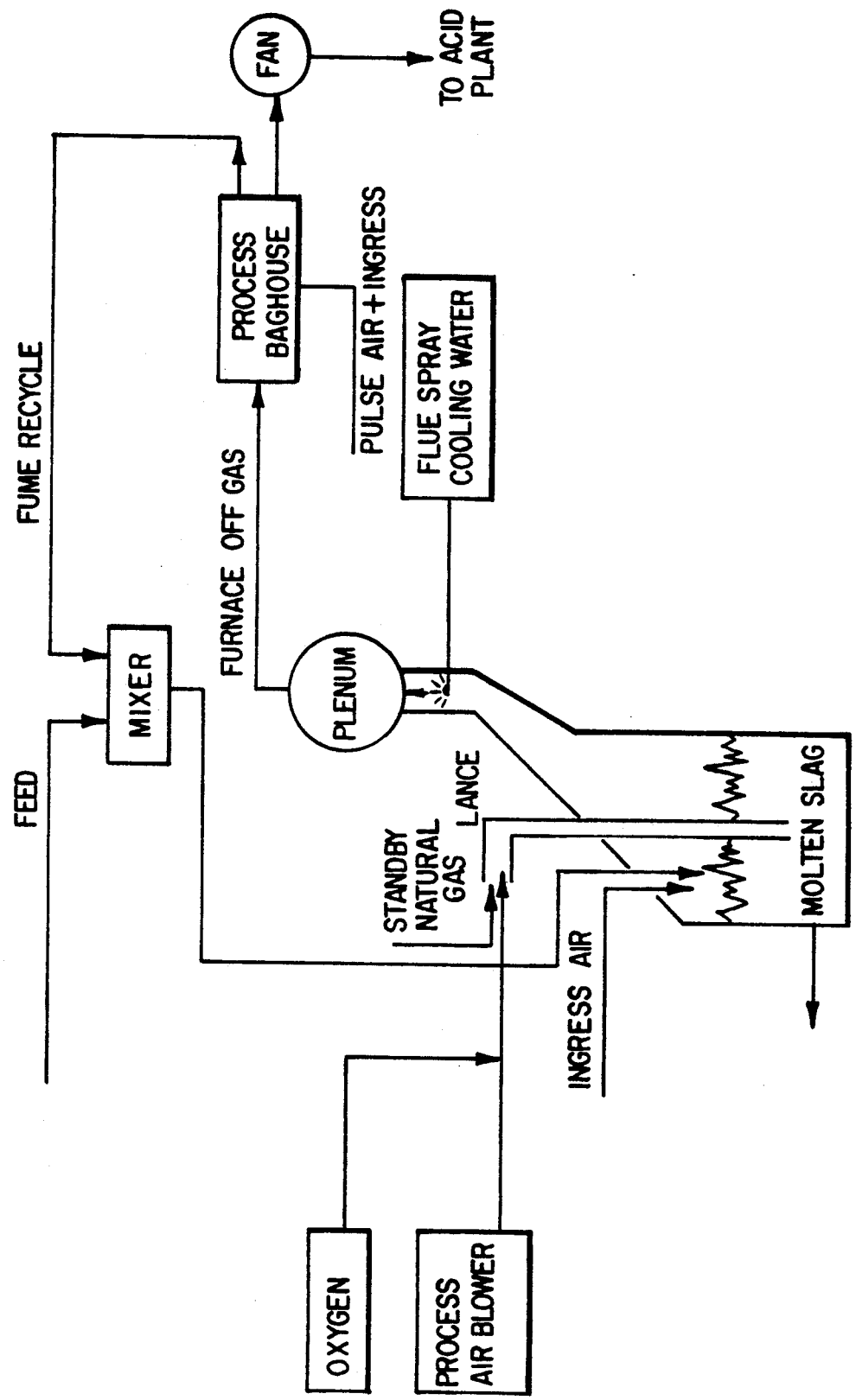

United States Patent [19]
Player et al.

[11] Patent Number: 5,256,186
[45] Date of Patent: Oct. 26, 1993

[54] METHOD FOR THE TREATMENT OF DUSTS AND CONCENTRATES

[75] Inventors: Roger L. Player; Steven P. Matthew, both of Mount Isa, Australia

[73] Assignee: Mount Isa Mines Limited, Brisbane, Australia

[21] Appl. No.: 773,320

[22] Filed: Oct. 10, 1991

[30] Foreign Application Priority Data

Oct. 12, 1990 [AU] Australia .............................. PK2779

[51] Int. Cl.⁵ .............................................. C21B 3/04
[52] U.S. Cl. .................................................. 75/695
[58] Field of Search ........................................ 75/695

[56] References Cited

U.S. PATENT DOCUMENTS

| | | | |
|---|---|---|---|
| 3,891,428 | 6/1975 | Todorov | 75/695 |
| 4,013,456 | 3/1977 | Bergsoe | 75/695 |
| 4,017,308 | 4/1977 | Petersen | 75/695 |
| 4,584,017 | 4/1986 | Lindquist | 75/695 |
| 4,909,839 | 3/1990 | Hollis | 75/695 |

Primary Examiner—Peter D. Rosenberg
Attorney, Agent, or Firm—Stevens, Davis, Miller & Mosher

[57] ABSTRACT

A method for the treatment of a mixture of lead dusts and pyritic concentrates said method including the steps of:
a) feeding a mixture of lead dust and pyritic concentrate to a furnace containing molten slag;
b) smelting the mixture by injecting air or oxygen enriched air into the slag by means of a submerged lance to produce a lead bearing slag; and
c) recycling fume to the furnace.

A method for the treatment of lead dusts, without pyritic concentrate, said method including the steps of:
a) feeding lead dust to a furnace containing molten slag;
b) smelting the dust by injecting air or oxygen enriched air into the slag by means of a submerged lance to produce a lead bearing slag; and
c) recycling fume to the furnace.

12 Claims, 1 Drawing Sheet

METHOD FOR THE TREATMENT OF DUSTS AND CONCENTRATES

This invention relates to a method for the treatment of dusts and concentrates particularly, the invention relates to a method for the treatment of lead dusts and low lead pyritic concentrates.

The invention has been developed primarily for use with lead dusts and low lead pyritic concentrates and will be described hereinafter with reference to such materials. However, it will be appreciated that the invention is not limited to this particular field of use.

Lead dusts are a by-product of conventional lead smelting and, in the past, these dusts had to be recycled many times to recover the lead. This increased the heat load on the smelter and reduced its capacity.

It is an object of the present invention to provide a method of smelting lead dusts and low lead pyritic concentrates which overcomes or substantially ameliorates the problems of the prior art.

In accordance with the present invention there is provided a method for the treatment of a mixture of lead dusts and pyritic concentrates said method including the steps of:
a) feeding a mixture of lead dust and pyritic concentrate to a furnace containing molten slag;
b) smelting the mixture by injecting air or oxygen enriched air into the slag by means of a submerged lance to produce a lead bearing slag; and
c) recycling fume to the furnace.

Also in accordance with the present invention there is provided a method for the treatment of lead dusts, without pyritic concentrate, said method including the steps of:
a) feeding lead dust to a furnace containing molten slag;
b) smelting the dust by injecting air or oxygen enriched air into the slag by means of a submerged lance to produce a lead bearing slag; and
c) recycling fume to the furnace.

Preferably, steps a), b) and c) of both of the above aspects of the invention are continuous.

In a preferred embodiment, coal, coke, oil or natural gas, or any combination thereof, may be used as a fuel.

In a further preferred embodiment, depending upon the gangue and ash content of the feed mixture, it may be necessary to add flux to produce a fluid slag.

The fume is preferably recycled to the furnace via a baghouse. Most preferably, the baghouse is a dedicated unit with an integral fume return system.

The preferred operating temperatures range from 1150° to 1250° C. with 1170° to 1190° C. as the most preferred range.

Preferably, the slag will contain less than 2% sulphur and the process offgas will have an $SO_2$ concentration of greater than 4% to aid $SO_2$ recovery at an acid plant.

Preferably the slag will have a composition in the range 20 to 50% Pb, 10 to 20% Fe, 5 to 15% $SiO_2$ and 2 to 5% CaO, with typical residual impurities of up to 10% Zn, 3% $Al_2O_3$ and 3% MgO.

A preferred embodiment of the invention will now be described, by way of example only, with reference to the accompanying FIGURE, in which:

FIG. 1 is a process flowsheet in accordance with the method of the invention.

The ISASMELT process is based on submerged gas injection into melts via a top entry submerged SIROSMELT lance to produce turbulent baths in which high intensity smelting or reduction reactions can occur.

Lead dust, low lead pyritic concentrate, coke breeze and flux are mixed in a pug mill with sufficient water to form a moist agglomerate feedstock. The feedstock is continuously fed to a furnace by conveyor and dropped directly into a molten slag bath where it is oxidized by air injected down a lance. The slag is tapped either continuously or batch-wise and the offgas cooled by a water spray directly above the furnace, as shown schematically in FIG. 1.

In the following examples two feed types are considered:

Mix A comprised 54.7% of lead sinter plant recycle dust, 12% of lead bearing copper converter dust and 33.3% of low lead pyritic concentrate. The low lead pyritic concentrate was included to increase the $SO_2$ content in the offgas.

Mix B comprised 82% of lead sinter plant recycle lead dust and 18% of lead bearing copper converter dust.

The material compositions are listed in Table 1.

TABLE 1

FEED MATERIALS USED DURING THE 250 Kg TESTWORK

| | FEED MATERIALS (wt %) | | | | NOMINAL CHARGE MIX (wt %) | |
|---|---|---|---|---|---|---|
| | Sinter Plant Recycle Dust | Copper Converter Dust | Low Lead Pyritic Concentrate | Silica Flux | Mix A 54.7% Recycle Dust 12% Converter Dust 33.3% Pyritic Concentrate | Mix B 82% Recycle Dust 18% Converter Dust |
| Pb | 32.20 | 30.10 | 13.50 | — | 25.72 | 31.82 |
| Zn | 5.10 | 7.60 | 7.60 | — | 6.23 | 5.55 |
| Fe | 8.49 | 1.50 | 24.40 | 1.0 | 12.95 | 7.23 |
| Cu | 1.90 | 2.50 | 2.00 | — | 2.01 | 2.01 |
| S | 12.40 | 13.10 | 33.00 | — | 19.34 | 13.53 |
| S/SO$_4$ | 4.91 | 12.30 | 1.80 | — | 4.76 | 6.24 |
| SiO$_2$ | 8.10 | 1.30 | 5.00 | 92.5 | 6.25 | 6.88 |
| Al$_2$O$_3$ | 1.70 | 0.20 | 0.60 | 2.5 | 1.15 | 1.43 |
| CaO | 5.10 | 3.20 | 1.10 | 0.5 | 3.54 | 4.76 |
| MgO | 0.50 | 0.20 | 0.20 | 0.3 | 0.36 | 0.45 |
| As | 1.20 | 4.10 | 2.00 | — | 1.81 | 1.72 |
| Sb | 0.80 | 0.80 | 0.70 | — | 0.77 | 0.80 |
| Cd | 0.76 | 1.10 | 0.02 | — | 0.55 | 0.82 |
| Bi | 0.11 | 1.48 | 0.05 | — | 0.25 | 0.36 |
| Ag (ppm) | 1520 | 270 | 4450 | — | 2340 | 1290 |
| Au (ppm) | 31.0 | trace | 7.2 | — | 19.0 | 26.0 |
| Moisture | 7.3% | 14.4% | 5.7% | 4.0% | | |

Proximate analysis Coke Breeze (5.5% moisture)
86.80% fixed carbon

TABLE 1-continued

FEED MATERIALS USED DURING THE 250 Kg TESTWORK

| FEED MATERIALS (wt %) | | | | NOMINAL CHARGE MIX Mix A | (wt %) Mix B |
|---|---|---|---|---|---|
| Sinter Plant Recycle Dust | Copper Converter Dust | Low Lead Pyritic Concentrate | Silica Flux | 54.7% Recycle Dust 12% Converter Dust 33.3% Pyritic Concentrate | 82% Recycle Dust 18% Converter Dust |
| | 4.20% | volatile matter | | | |
| | 8.59% | ash | | | |
| | 0.46% | moisture | | | |

EXAMPLE 1

Testwork on the lead dusts and low lead pyritic concentrates was carried out in a 250 kg ISASMELT test furnace. A total of 1780 kg of lead sinter plant recycle dust, 380 kg of lead bearing copper converter dust and 550 kg of low lead pyritic concentrate were smelted in 17 runs over 29 hours operating time.

The 250 kg ISASMELT test furnace has an internal diameter of 380 mm and is 1.5 m high and lined with chrome-magnesite refractories. Air is injected into the bath via a 40 mm nominal bore lance. Feed is added via a variable speed conveyor and drops directly into the molten slag bath. The offgas passes through an evaporative gas cooler and is cleaned in a reverse pulse baghouse.

The feed materials were mixed with coke breeze and pelletized prior to each run. Recycled fume was added during the run at a rate approximating the fume rate measured at the baghouse. Silica flux was also added to the Mix A material.

At the beginning of each series of runs, lead slag was fed into the furnace and melted to form a starting bath. The dust/concentrate mixture was then fed into the furnace at a controlled rate and smelted. Both normal air and air enriched to 35% $O_2$ were used. Oil was used as a supplementary fuel to the coke breeze.

During each run, slag samples were taken periodically from the furnace and the fume rates were measured at the baghouse. Operating temperatures ranged from 1150° to 1250° C., with 1170° to 1190° C. providing optimum conditions. At the conclusion of each run the slag was tapped into moulds and weighed.

The operating conditions and results from this testwork are tabulated in Table 2. Product assays from this testwork are given in Table 3.

TABLE 2

| RUN NUMBER | STARTING BATH Initial Depth (mm) | Initial Charge | NEW MATERIAL CHARGE (Dry %) D & L* | NEW MATERIAL CHARGE (Dry %) EP** | NEW MATERIAL CHARGE (Dry %) Cons | CHARGE ADDITIONS Dry % of New Material Silica Flux | CHARGE ADDITIONS Dry % of New Material Coke | CHARGE ADDITIONS Dry % of New Material Return Fume | NOMINAL MOISTURE CONTENT | TOTAL RUN TIME (min) | ACTUAL SMELTING TIME (min) | NEW MATERIAL SMELTED (kg, dry) | AVERAGE SMELTING RATE (kg/hr) (dry) | FINAL BATH DEPTH (mm) |
|---|---|---|---|---|---|---|---|---|---|---|---|---|---|---|
| 1 Mix A 27/2/89 | 130 | 90 kg High Lead Slag | 54.8% | 11.2% | 34.0% | 4.3% | 12.8% | — | 13.0% | 195 | 195 ie 100% | 310 | 95 | 430 |
| 2 Mix A 27/2/89 | 100 | Continuing from Run 1 | 54.8% | 11.2% | 34.0% | 4.3% | 12.8% | — | 13.0% | 150 | 150 ie 100% | 246 | 98 | 450 |
| 3 Mix A 1/3/89 | 130 | 70 kg Run 2 Slag + 30 kg High Lead Slag | 54.8% | 11.2% | 34.0% | 4.3% | 15.3% | 12.2% | 15.0% | 205 | 50 | 64 | 77 | 220 |
| 4 Mix A 2/3/89 | 140 | 100 kg High Lead Slag | 54.8% | 11.2% | 34.0% | 4.3% | 15.3% | 12.2% | 14.5% | 360 | ie 24% 105 ie 29% | 109 | 62 | 180 |
| 5 Mix A 3/3/89 | 200 | 80 kg High Lead Slag | 54.8% | 11.2% | 34.0% | 4.3% | 15.3% | 12.2% | 14.0% | 160 | 160 ie 100% | 141 | 53 | 280 |
| 6 Mix B 3/3/89 | 160 | Continuing + 30 kg High Lead Slag | 83.1% | 16.9% | — | — | 20.3% | 16.1% | 14.2% | 105 | 105 ie 100% | 119 | 68 | 180 |
| 7 Mix B 4/3/89 | 175 | 90 kg High Lead Slag | 83.1% | 16.9% | — | — | 20.3% | 16.1% | 13.5% | 115 | 100 ie 87% | 91 | 55 | 140 |
| 8 Mix B 7/3/89 | 165 | 28 kg Reverb Slag + 51 kg Fumes | 82.0% | 18.0% | — | — | — | 111.7% | 22.0% | 150 | 97 ie 65% | 92 | 57 | 410 |
| 9 Mix B 7/3/89 | 170 | Continuing from Run 8 | 82.0% | 15.0 | — | — | — | 43.9% | 19.6% | 45 | 45 ie 100% | 50 | 67 | 240 |
| 10 Mix B 8/3/89 | 120 | 50 kg Slag from Run 9 + 12 kg Fume | 82.0% | 13.0% | — | — | — | 24.1% | 16.5% | 185 | 145 ie 78% | 243 | 101 | 330 |
| 11 Mix A 10/3/89 | 110 | 50 kg Slag from Run 9 + 12 kg Fume | 54.6% | 12.1% | 33.3% | 4.0% | — | 4.4% | 13.5% | 110 | 110 ie 100% | 180 | 98 | 380 |
| 12A Mix A 10/3/89 | 210 | Continuing from Run 11 | 54.7% | 11.8% | 33.5% | 4.1% | 4.3% | 3.4% | 12.7% | 50 | 50 ie 100% | 79 | 95 | 300 |
| 12B Mix A 10/3/89 | 300 | Continuing from Run 12A | 54.8% | 11.2% | 34.0% | 4.3% | 15.3% | 12.2% | 12.0% | 45 | 45 ie 100% | 60 | 80 | 390 |
| 13 Mix A 10/3/89 | 120 | 35 kg Slag from Run 9 + | 82.0% | 18.0% | — | — | — | 1.8% | 13.0% | 80 | 80 ie 100% | 202 | 152 | 350 |
| 14 Mix B 13/3/89 8 kg Fume | 100 | Continuing from Run 13 | 82.4% | 17.6% | — | — | 8.4% | 6.7% | 13.0% | 45 | 32 ie 71% | 72 | 135 | 185 |
| 15 Mix B 13/3/89 | 130 | 40 kg Slag | 54.6% | 12.1% | 33.3% | 4.0% | — | 3.1% | 13.0% | 95 | 95 | 251 | 159 | 400 |

TABLE 2-continued

| RUN NUMBER | PRODUCTS Tapped Slag (kg) | Bag House Fume (kg) | STEADY STATE LANCE AIR RATE Oxygen Content (vol %) | Rate Nm³/kg Feed | Excess Oxygen Content | STEADY STATE OIL RATE kg/hr (Total) | g/kg New Material (See Note) | SMELTING TEMP (°C) | FUME RATE Dry % of New Material Measured | By Mass Balance | COMMENTS |
|---|---|---|---|---|---|---|---|---|---|---|---|
| Mix A 14/3/89 | from Run 9 + 4 kg Fume | | | | | | | | | ie 100% | |
| 16A Mix A 14/3/89 | Continuing from Run 15 | 130 | 54.7% | 11.7% | 33.6% | 4.2% | 6.6% | | 5.3% | 13.0% | 60 / 57 |
| 16B Mix A 14/3/89 | Continuing from Run 16A | 295 | 54.8% | 11.2% | 34.0% | 4.3% | 15.3% | | 12.2% | 13.0% | 35 / 35 ie 100% |
| 17 Mix A 14/3/89 | Continuing from Run 16B | 185 | 82.4% | 17.6% | — | — | — | | 6.8% | 13.0% | 120 / 90 ie 75% |
| Mix B 14/3/89 | | | | | | | 8.5% | | | | 295 / 350 / 495 |
| 1 Mix A 27/2/89 | 68 | 46 | 21 | 2.74 | 1.1% | 9.3 | 39 | 1170 to 1200 | 15% | — | Steady operation. |
| 2 Mix A 27/2/89 | 213 | 55 | 21 | 2.64 | 1.2% | 7.2 | 16 | 1200 to 1210 | 22% | — | Steady operation. Oil consumption dropping as furnace heats up. |
| 3 Mix A 1/3/89 | 75 + 82 in offtake | 41 | 21 | 4.08 | 0.9% | 14.4 | 115 | 1160 to 1180 | 64% | — | Irregular operation as plant air low, =) Several stoppages to heat bath. |
| 4 Mix A 2/3/89 | 46 + 54 in | 80 | 21 | 4.31 | 1.7 | 12.0 | 103 | 1180 to 1200 | 73% | — | Irregular operation as plant air low, =) Several stoppages to heat bath. |
| 5 Mix A 3/3/89 | 113 | 100 | 21 | 4.67 | 1.0% | 12.3 | 127 | 1220 to 1240 | 71% | — | Reasonably steady operation. Rates low as plant air still low. |
| 6 Mix B 3/3/89 | 60% + 100 mm sludge | 62 | 21 | 4.67 | 2.2% | 13.5 | 116 | 1170 to 1250 | 52% | — | Plant air low. Thick slag on furnace bottom covering cermet. =) large temperature and oil fluctuations |
| 7 Mix B 4/3/89 | 52 + wall accretion | 48 | 21 | 5.53 | 2.1% | 15.6 | 183 | 1150 to 1180 | 53% | — | Plant air low. Accretion buildup on walls. |
| 8 Mix B 7/3/89 | 110 | 53 | 21 | 4.47 | 1.5% | 19.8 | 250 | 1160 to 1190 | 58% | — | Plant air low, =) irregular operation to start but improving towards end of run |
| 9 Mix B 7/3/89 | 148 | 14 | 21 | 3.68 | 3.2% | 16.5 | 164 | 1190 to 1210 | 28% | 44% | Steady operation. |
| 10 Mix B 8/3/89 | 110 | 53 | 21 | 2.40 | 3.0% | 15.9 | 102 | 1140 to 1180 | 22% | 23% | Lance change from 30 mm to 40 mm at start of run due to high lance back-pressures. Steady operation after first 40 kg feed. |
| 11 Mix A 10/3/89 | 74 | 54 | 21 | 2.52 | 3.0% | 13.2 | 77 | 1170 to 1200 | 30% | 3.4% | Steady operation. Good hygiene. |
| 12A Mix A | 145 kg total | 9 | 21 | 2.35 | 3.0% | 8.7 | 33 | 1188 to 1200 | 11% | 2.8% | Steady operation. Good hygiene. |

TABLE 2-continued

| | | | | | | | | | |
|---|---|---|---|---|---|---|---|---|---|
| 10/3/89 12B Mix A 10/3/89 | for 12A & 12B | 7 | 21 | 3.96 | 3.0% | 11.1 | 63 | 1185 to 1200 | 12% | 10.0% | Approximately 50 mm stable foam. Fairly steady operation. Hygiene deterioration at this higher coke rate. Approximately 100 mm stable foam. |
| 13 Mix B 13/3/89 | 138 | 6 | 35 | 0.82 | 3.0% | 13.2 | 63 | 1180 to 1210 | 5% | 8.3% | Burner Out Overnight, Bags Oiled =) Re-Bagged Oxygen problems at start. bath held approx 1 hr. Steady operations once started. Good hygiene. |
| 14 Mix B 13/3/89 | 76 | 9 | 35 | 0.93 | 3.0% | 6.0 | 16 | 1170 to 1220 | 12% | 7.2% | Downtime to repair oxygen line and heat bath. Lost oxygen pressure at end of run. Good hygiene. |
| 15 Mix A 14/3/89 | 147 | 5 | 35 | 0.98% | 3.0% | 12.0 | 52 | 1150 to 1180 | 2% | 3.2% | Steady operation. Good hygiene. |
| 16A Mix A 14/3/89 | 105 kg total for 16A & 16B | 3 | 35 | 1.08 | 3.0% | 6.0 | 16 | 1150 to 1180 | 2% | 5.5% | Steady operation apart from 3 min downtime to change oxygen bottles. Good hygiene. |
| 16B Mix A 14/3/89 | | 1 | 35 | 1.33 | 3.0% | 2.1 | −14 | 1160 to 1180 | 2% | 12.6% | Steady operation. Approximately 100 mm stable foam. |
| 17 Mix B 14/3/89 | 200 | 9 | 35 | 1.00 | 3.0% | 7.2 | 25 | 1170 to 1210 | 5% | 8.4% | Initial hygiene problems. 25 min downtime for lance change - burnt out. |

*Recycle lead sinter plant dust.
**Lead containing dust from copper converter electrostatic precipitator.
Note.
Specific Oil Rate, Corrected for Furnace Heat Losses.
(equivalent to 5.6 kg oil/hr for air)
(equivalent to 3.8 kg oil/hr at 35:02)

TABLE 3

ASSAYS (wt %)

| RUN NUMBER | | Pb | Ag (ppm) | Au (ppm) | Zn | Fe | Cu | S | SiO2 | Al2O3 | CaO | MgO | As | Sb | Cd | Bi |
|---|---|---|---|---|---|---|---|---|---|---|---|---|---|---|---|---|
| 1 | Starting Bath | 42.1 | 857 | — | 8.2 | 21.9 | 0.85 | <0.01 | 9.2 | 2.1 | 1.3 | 0.86 | 0.04 | 0.21 | 0.004 | <0.001 |
| Mix A | Final Slag | 8.6 | 1700 | 27.7 | 7.5 | 30.3 | 3.19 | 0.25 | 21.2 | 3.2 | 6.5 | 1.16 | 0.23 | 0.94 | 0.001 | 0.003 |
| 27/2/89 | Final Fume | 61.4 | 2650 | 1.5 | 7.70 | 0.47 | 0.10 | 5.40 | 0.60 | 0.12 | 0.12 | 0.12 | 2.68 | 0.52 | 1.090 | 0.510 |
| 2 | Starting Bath | 8.6 | 1700 | 27.7 | 7.5 | 30.3 | 3.19 | 0.25 | 21.2 | 3.2 | 6.5 | 1.16 | 0.23 | 0.94 | 0.001 | 0.003 |
| Mix A | Final Slag | 8.1 | 1620 | 20.3 | 6.8 | 29.2 | 3.01 | 0.44 | 21.9 | 3.1 | 7.3 | 0.95 | 0.23 | 1.02 | 0.002 | 0.002 |
| 27/2/89 | Final Fume | 59.2 | 2024 | 2.3 | 6.60 | 1.94 | 0.24 | 5.00 | 1.80 | 0.29 | 0.43 | 0.27 | 2.56 | 0.40 | 1.140 | 0.470 |
| 3 | Starting Bath | 13.0 | 1060 | 20.7 | 6.9 | 27.7 | 3.22 | 0.02 | 19.8 | 3.0 | 6.0 | 1.59 | 0.06 | 0.85 | 0.001 | 0.002 |
| Mix A | Final Slag | 16.6 | 1140 | 17.8 | 7.4 | 25.4 | 2.96 | 0.37 | 19.3 | 2.8 | 5.8 | 1.36 | 0.22 | 0.87 | 0.022 | 0.037 |
| 1/3/89 | Final Fume | 57.6 | 6400 | 17.7 | 6.10 | 1.29 | 0.27 | 5.40 | 1.90 | 0.22 | 0.28 | 0.21 | 3.69 | 0.52 | 1.460 | 0.600 |
| 4 | Starting Bath | 29.3 | 640 | 4.6 | 8.3 | 25.9 | 1.66 | <0.01 | 13.4 | 2.5 | 2.8 | 1.26 | 0.03 | 0.47 | <0.001 | 0.001 |
| Mix A | Final Slag | 19.2 | 660 | 6.3 | 8.7 | 25.7 | 2.39 | <0.01 | 18.6 | 2.7 | 4.7 | 1.34 | 0.10 | 0.77 | 0.008 | 0.023 |
| 2/3/89 | Final Fume | 59.9 | 4437 | 26.5 | 5.80 | 0.76 | 0.19 | 5.80 | 0.10 | 0.13 | 0.12 | 0.12 | 3.12 | 0.49 | 1.340 | 0.470 |
| 5 | Starting Bath | 27.2 | 535 | 1.4 | 7.7 | 25.1 | 1.75 | <0.01 | 15.3 | 2.6 | 3.3 | 1.72 | 0.01 | 0.49 | <0.001 | 0.001 |
| Mix A | Final Slag | 14.6 | 445 | 4.8 | 7.7 | 26.3 | 2.92 | <0.01 | 20.3 | 3.0 | 5.9 | 1.77 | 0.11 | 0.92 | 0.001 | 0.001 |
| 3/3/89 | Final Fume | 61.0 | 4582 | 20.9 | 6.60 | 0.30 | 0.19 | 5.30 | — | 0.11 | 0.08 | 0.07 | 3.64 | 0.39 | 1.250 | 0.520 |
| 6 | Starting Bath | 36.1 | 885 | 2.0 | 8.1 | 24.2 | 1.25 | <0.01 | 10.9 | 2.3 | 2.1 | 0.99 | 0.06 | 0.36 | 0.004 | 0.003 |
| Mix B | Final Slag | 15.1 | 220 | 6.1 | 10.1 | 24.8 | 2.59 | 0.02 | 18.1 | 3.4 | 7.7 | 1.51 | 0.21 | 1.04 | 0.005 | 0.015 |
| 3/3/89 | Final Fume | 62.4 | 3227 | 19.9 | 3.60 | 0.12 | 0.14 | 6.00 | — | 0.10 | 0.04 | 0.06 | 3.81 | 0.36 | 1.380 | 1.100 |
| 7 | Starting Bath | 39.4 | 770 | 1.5 | 8.6 | 23.4 | 1.10 | 0.04 | 9.3 | 2.2 | 1.6 | 0.81 | 0.06 | 0.30 | <0.001 | 0.002 |
| Mix B | Final Slag | 28.4 | 550 | 5.7 | 9.8 | 20.5 | 2.59 | <0.01 | 14.0 | 2.7 | 5.3 | 1.12 | 0.28 | 0.88 | 0.010 | 0.076 |
| 4/3/89 | Final Fume | 66.1 | 3226 | 28.2 | 1.87 | 0.05 | 0.12 | 5.60 | — | 0.07 | 0.03 | 0.03 | 3.82 | 0.31 | 1.310 | 1.050 |
| 8 | Starting Bath | 27.2 | 700 | 3.2 | 6.2 | 23.1 | 0.79 | <0.01 | 15.8 | 2.9 | 3.3 | 1.46 | 0.21 | 0.36 | 0.008 | 0.014 |
| Mix B | Final Slag | 39.2 | 1575 | 13.6 | 8.2 | 17.1 | 1.39 | <0.01 | 11.0 | 1.8 | 3.7 | 1.06 | 0.91 | 0.66 | 0.152 | 0.200 |
| 7/3/89 | Final Fume | 60.9 | 4880 | 29.2 | 1.34 | 0.07 | 0.11 | 5.30 | — | 0.31 | 0.04 | 0.04 | 2.78 | 0.25 | 3.600 | 0.460 |
| 9 | Starting Bath | 39.2 | 1575 | 13.6 | 8.2 | 17.1 | 1.39 | <0.01 | 11.0 | 1.8 | 3.7 | 1.06 | 0.91 | 0.66 | 0.152 | 0.200 |
| Mix B | Final Slag | 39.8 | 1435 | 15.6 | 8.2 | 15.5 | 1.71 | <0.01 | 10.7 | 1.8 | 4.4 | 0.91 | 1.04 | 0.78 | 0.098 | 0.260 |
| 7/3/89 | Final Fume | 61.4 | 4262 | 28.4 | 1.23 | 0.10 | 0.11 | 5.70 | — | 0.11 | 0.04 | 0.06 | 3.63 | 0.25 | 3.510 | 0.710 |
| 10 | Starting Bath | 35.3 | 1240 | 9.7 | 8.4 | 30.5 | 1.74 | <0.01 | 11.4 | 2.1 | 4.1 | 1.53 | 0.42 | 0.72 | 0.015 | 0.102 |
| Mix B | Final Slag | 40.8 | 1065 | 12.8 | 8.9 | 12.5 | 2.84 | <0.01 | 11.3 | 2.0 | 6.6 | 0.82 | 0.84 | 1.14 | 0.011 | 0.076 |
| 8/3/89 | Final Fume | 62.0 | 3635 | 23.5 | 1.25 | 0.02 | 0.08 | 5.80 | — | 0.08 | 0.02 | 0.08 | 3.89 | 0.21 | 2.570 | 1.710 |
| 11 | Starting Bath | 42.2 | 1100 | 9.8 | 8.3 | 17.0 | 1.41 | <0.01 | 10.2 | 1.8 | 3.9 | 0.92 | 0.70 | 0.65 | 0.020 | 0.102 |
| Mix A | Final Slag | 41.4 | 2016 | 13.6 | 8.2 | 15.7 | 2.05 | 0.01 | 11.1 | 1.5 | 4.1 | 0.56 | 1.10 | 0.86 | 0.060 | 0.126 |
| 10/3/89 | Final Fume | 59.6 | 7042 | 12.1 | 0.79 | 0.03 | 0.09 | 4.60 | — | 0.10 | 0.02 | 0.02 | 5.50 | 0.31 | 3.210 | 0.880 |
| 12A | Starting Bath | 41.4 | 2016 | 13.6 | 8.2 | 15.7 | 2.05 | 0.01 | 11.1 | 1.5 | 4.1 | 0.56 | 1.10 | 0.86 | 0.060 | 0.126 |
| Mix A | Final Slag | 33.0 | 2216 | 17.3 | 8.1 | 16.1 | 2.23 | 0.03 | 12.2 | 1.6 | 4.6 | 0.53 | 1.20 | 0.91 | 0.127 | 0.170 |
| 10/3/89 | Final Fume | 60.6 | 6269 | 24.7 | 1.33 | 0.16 | 0.15 | 6.00 | — | 0.12 | 0.05 | 0.07 | 3.42 | 0.34 | 2.940 | 0.450 |
| 12B | Starting Bath | 38.0 | 2216 | 17.3 | 8.1 | 16.1 | 2.23 | 0.03 | 12.2 | 1.6 | 4.6 | 0.53 | 1.20 | 0.91 | 0.127 | 0.170 |
| Mix A | Final Slag | 37.6 | 2192 | 17.4 | 8.1 | 16.1 | 2.15 | <0.01 | 11.8 | 1.6 | 4.5 | 0.61 | 1.20 | 0.89 | 0.160 | 0.181 |
| 10/3/89 | Final Fume | 58.2 | 6687 | 25.3 | 0.85 | 0.09 | 0.18 | 6.60 | — | 0.11 | 0.04 | 0.07 | 3.23 | 0.35 | 2.960 | 0.460 |
| 13 | Starting Bath | 38.0 | 1038 | 10.4 | 8.7 | 19.5 | 1.36 | <0.01 | 10.4 | 1.9 | 3.3 | 0.86 | 0.55 | 0.62 | 0.021 | 0.070 |
| Mix B | Final Slag | 39.7 | 1457 | 24.7 | 8.1 | 12.9 | 2.40 | 0.06 | 10.8 | 1.9 | 6.4 | 0.60 | 1.30 | 1.11 | 0.193 | 0.221 |
| 13/3/89 | Final Fume | 57.2 | 4514 | 25.8 | 1.09 | 0.07 | 0.14 | 5.30 | — | 0.15 | 0.05 | 0.04 | 4.14 | 0.30 | 3.830 | 1.220 |
| 14 | Starting Bath | 39.7 | 1457 | 24.7 | 8.1 | 12.9 | 2.40 | 0.06 | 10.8 | 1.9 | 6.4 | 0.60 | 1.30 | 1.11 | 0.193 | 0.221 |
| Mix B | Final Slag | 34.9 | 1405 | 26.2 | 8.9 | 14.4 | 2.78 | 0.01 | 12.1 | 2.3 | 7.6 | 0.71 | 1.34 | 1.26 | 0.124 | 0.231 |
| 13/3/89 | Final Fume | 60.3 | 3831 | 36.0 | 1.49 | 0.17 | 0.13 | 5.50 | — | 0.14 | 0.06 | 0.05 | 3.63 | 0.29 | 3.090 | 0.850 |
| 15 | Starting Bath | 26.8 | 793 | 11.2 | 9.0 | 22.5 | 2.26 | <0.01 | 13.2 | 2.6 | 5.9 | 1.28 | 0.47 | 0.93 | 0.068 | 0.109 |
| Mix A | Final Slag | 30.7 | 2016 | 18.1 | 8.2 | 18.1 | 2.65 | <0.01 | 14.1 | 1.9 | 5.5 | 0.64 | 0.98 | 1.07 | 0.101 | 0.193 |
| 14/3/89 | Final Fume | 57.7 | 5499 | 41.0 | 2.18 | 0.64 | 0.18 | 4.90 | — | 0.09 | 0.05 | 0.05 | 5.44 | 0.35 | 2.640 | 0.770 |
| 16A | Starting Bath | 30.9 | 2016 | 18.1 | 8.2 | 18.1 | 2.65 | <0.01 | 14.1 | 1.9 | 5.5 | 0.64 | 0.98 | 1.07 | 0.101 | 0.193 |
| Mix A | Final Slag | 30.0 | 2038 | 15.3 | 8.4 | 18.9 | 2.80 | <0.01 | 14.6 | 1.9 | 5.6 | 0.60 | 0.95 | 1.08 | 0.102 | 0.199 |
| 14/3/89 | Final Fume | 58.0 | 5967 | 41.2 | 2.13 | 0.87 | 0.25 | 4.80 | — | 0.15 | 0.13 | 0.09 | 5.18 | 0.41 | 2.440 | 0.730 |
| 16B | Starting Bath | 30.0 | 2038 | 15.3 | 8.4 | 18.9 | 2.80 | <0.01 | 14.6 | 1.9 | 5.6 | 0.60 | 0.95 | 1.08 | 0.102 | 0.199 |
| Mix A | Final Slag | 30.2 | 2030 | 14.9 | 8.2 | 18.0 | 2.66 | <0.01 | 15.5 | 1.9 | 5.5 | 0.58 | 0.89 | 1.06 | 0.131 | 0.213 |
| 14/3/89 | Final Fume | 57.6 | 7330 | 27.1 | 1.28 | 0.37 | 0.25 | 4.50 | — | 0.09 | 0.07 | 0.02 | 6.34 | 0.49 | 2.810 | 0.740 |
| 17 | Starting Bath | 30.2 | 2030 | 14.9 | 8.2 | 18.0 | 2.66 | <0.01 | 15.5 | 1.9 | 5.5 | 0.58 | 0.89 | 1.06 | 0.131 | 0.213 |
| Mix B | Final Slag | 32.7 | 1289 | 17.3 | 9.0 | 15.7 | 2.81 | <0.01 | 13.0 | 2.3 | 7.2 | 0.85 | 0.90 | 1.21 | 0.105 | 0.260 |
| 14/3/89 | Final Fume | 58.0 | 4486 | 36.9 | 1.77 | 0.85 | 0.21 | 5.60 | — | 0.08 | 0.06 | 0.08 | 4.18 | 0.35 | 2.820 | 0.720 |
| Note. Average Steady State Slags are for Mix A: | | 31.1 | 2843 | 23.2 | 7.6 | 15.8 | 2.45 | 0.01 | 11.6 | 1.7 | 4.35 | 0.48 | 2.25 | 0.93 | 0.675 | 0.329 |
| Mix B: | | 40.4 | 1603 | 31.6 | 7.1 | 9.1 | 2.57 | 0.01 | 8.9 | 1.9 | 6.03 | 0.57 | 2.27 | 1.02 | 1.060 | 0.393 |

EXAMPLE 2

Consideration of the 250 kg scale testwork has resulted in the flowsheet for the production plant shown in FIG. 1.

This proposed ISASMELT plant will smelt either Mix A or B material, or any combination thereof, and two specific scale up options are considered in this example:

Option 1: Smelt 4 tph of by-product lead dusts together with 2 tph of low lead pyritic concentrate, giving a total treatment rate of 3600 tonnes per month at an availability of 80%.

Option 2: Smelt only lead dusts at a rate of 4 tph, giving a treatment rate of 2400 tonnes per month at an availability of 80%.

A budget estimate for an ISASMELT plant has been developed and is shown in Table 4 and the cost estimate in Tables 5 and 6.

TABLE 4

| | PROCESS SUMMARY | |
|---|---|---|
| | Option 1 | Option 2 |
| Material | MIX A | MIX B |
| | 54.7% recycle lead dust | 82% recycle lead dust |

TABLE 4-continued

PROCESS SUMMARY

| | Option 1 | Option 2 |
|---|---|---|
| | 12.0% converter dust 33.3% pyritic concentrate | 18% converter dust |
| Treatment rate, ie @ 80% availability | 6 tonnes/hr 3600 tonnes/month | 4 tonnes/hr 2400 tonnes/month |
| Lead slag product | 5.0 tonnes/hr (31% Pb, <0.05% S) | 3.2 tonnes/hr (40% Pb, <0.05% S) |
| Operating temperature | 1170 to 1190° C. | 1170 to 1190° C. |
| Lance air (35% $O_2$) | | |
| Blower @ 150 kPa | 1.33 $Nm^3$/s | 0.75 $Nm^3$/s |
| Oxygen @ 150 kPa | 0.29 $Nm^3$/s (36 tpd) | 0.16 $Nm^3$/s (20 tpd) |
| Coke breeze | 650 kg/hr | 510 kg/hr |
| Natural gas (standby burner) | 125 $Nm^3$/hr 10% duty cycle | 125 $Nm^3$/hr 10% duty cycle |
| Silica flux | 240 kg/hr | — |
| Recycle fume (5% of feed) | 300 kg/hr | 200 kg/hr |
| Spray cooling water | 1.5 liters/s | 1.1 liters/s |
| Furnace offgas | | |
| Wet | 4.9 $Nm^3$/s | 3.6 $Nm^3$/s |
| Dry | 2.6 $Nm^3$/s @ 8.4% $SO_2$ | 2.0 $Nm^3$/s @ 4.9% $SO_2$ |
| Dust loading (wet gas @ 200° C.) | 10 g/$m^3$ | 9 g/$m^3$ |
| Offgas after process gas baghouse | 2.8 $Nm^3$/s @ 7.8% $SO_2$ (dry basis) | 2.2 $Nm^3$/s @ 4.5% $SO_2$ (dry basis) |

TABLE 5

BUDGET CAPITAL ESTIMATE FOR ISASMELT PLANT

| | Australian |
|---|---|
| Mixer | $ 100 000 |
| Feed Conveyor | 50 000 |
| ISASMELT vessel (refractory lined, 1.0⊥⊥ ID) | ↓↓↓ ↓↓↓ |
| Lance handling | 75 000 |
| Plenum | 50 000 |
| Control room | 75 000 |
| Process air blower (400 kW) | 200 000 |
| Process air line | 75 000 |
| Process gas fluo (150M) | 75 000 |
| Structural steel | 350 000 |
| Foundations | 150 000 |
| SUBTOTAL | $2 000 000 |
| Process gas baghouse | 200 000 |
| Process gas fan | 40 000 |
| Chain conveyor | 75 000 |
| SUBTOTAL | $2 315 000 |
| Instrumentation @ 10% | 231 500 |
| Electrics @ 10% | 231 500 |
| Engineering design @ 20% | 463 000 |
| SUBTOTAL | $3 241 000 |
| Contingency @ 30% | 972 000 |
| Total budget capital estimate | AU$4 213 000 |

Exclusions:
Feed bins and weighers
Hygiene ventilation requirements
Product handling. i.e., slag granulation or casting
Provision of services

TABLE 6

PART 1
Operating Cost Estimate for Option 1
Smelting 6 tonnes/hr of Lead Dusts and Concentrate at 80% availability

| ITEM | BASIS FOR ESTIMATE | ANNUAL COST AUD (1000) |
|---|---|---|
| Labour | ½ Metallurgist/Supervisor | 40 |
| | 12 Operators (ie 3 per shift) | 568 |
| Oxygen | 0.29 $Nm^3$/s by 80% | 978 |
| Coke breeze | 650 kg/hr by 80% | 170 |
| Flux | 240 kg/hr by 80% | 12 |
| Natural gas | 125 $Nm^3$/hr by 10% (heating and holding) | 19 |
| Engineering maintenance | Labour: 1 Fitter | 47 |
| | Materials: Based on current ISASMELT usage | 100 |
| Other stores | Based on current ISASMELT usage | 150 |
| Refractories | 50 tonnes Chrome-Magnesite bricks (1 year life) plus Launders, etc. (labour and materials) | 200 |
| Baghouse bags | 630 $m^2$ Ryton bags (bag life of 1 year) | 43 |
| Compressed air | Based on current ISASMELT usage (baghouse and general) | 50 |
| Power | Total power usage 500 kW | 178 |
| Fresh Water | 6 $m^3$/hr by 90% (flue spray and general) | 5 |
| Transport | Based on material moved | 82 |
| TOTAL COST | | 2640 |
| UNIT COST PER TONNE OF LEAD | | |
| 33800 tonnes slag produced pa @ 31% Pb | | AUD252 |

PART 2
Operating Cost Estimate for Option 2
Smelting 4 tonnes/hr of Lead Dusts at 80% availability

| ITEM | BASIS FOR ESTIMATE | ANNUAL COST AUD (1000) |
|---|---|---|
| Labour | ½ Metallurgist/Supervisor | 40 |
| | 12 Operators (ie 3 per shift) | 568 |
| Oxygen | 0.16 $Nm^3$/s by 80% | 540 |
| Coke breeze | 510 kg/hr by 80% | 133 |
| Flux | None required | 0 |
| Natural gas | 125 $Nm^3$/hr by 10% (heating and holding) | 19 |
| Engineering maintenance | Labour: 1 Fitter | 47 |
| | Materials: Based on current ISASMELT usage | 100 |
| Other stores | Based on current ISASMELT usage | 150 |
| Refractories | 50 tonnes Chrome-Magnesite bricks (1 year life) plus Launders, etc. (labour and materials) | 200 |
| Baghouse bags | 630 $m^2$ Ryton bags (bag life of 1 year) | 32 |
| Compressed air | Based on current ISASMELT usage (baghouse and general) | 50 |
| Power | Total power usage 500 kW @ USD0.030/kWH | 178 |
| Fresh Water | 5 $m^3$/hr by 90% (flue spray and general) | 4 |
| Transport | Based on material moved | 54 |
| TOTAL COST | | 2115 |
| UNIT COST PER TONNE OF LEAD | | |
| 21700 tonnes slag produced pa @ 40% Pb | | AUD244 |

The maximum smelting rates used during the 250 kg testwork were 150 to 160 kg/hr for Mix A and B materials, indicating that a furnace of 1.3 m internal diameter would smelt in excess of 6 tonnes/hr. For greater operating flexibility, however, a diameter of 1.8 m is preferred for both Options 1 and 2.

The lance air rates used during the 250 kg testwork are calculated to give a slight oxygen excess, possibly 3%, in the offgas in addition to fully oxidizing the feed and burning the coke and oil. An excess oxygen concentration has been shown from the Applicant's plant operating experience to provide optimum smelting conditions.

The smelting air rates enriched to 35% $O_2$ used during the trials were 0.421 $Nm^3/kg$ of Mix A and 0.175 $Nm^3/kg$ of Mix B, with a fuel combustion air rate of 5.09 $Nm^3/kg$ of coke breeze. Scaling in proportion, the lance air requirement enriched to 35% $O_2$ on a production plant is 1.62 $Nm^3/s$ for Option 1 and 0.91 $Nm^3/s$ for Option 2.

The air component of these flowrates is 1.33 $Nm^3/s$ for Option 1 and 0.75 $Nm^3/s$ for Option 2. The air supply pressure is 150 kPa for low pressure lances, supplied from a single stage blower.

The oxygen consumptions to enrich the lance air to 35% $O_2$ are 36 and 20 tonnes per day for Options 1 and 2 respectively. Oxygen enrichment is used to increase the $SO_2$ concentration in the process offgas to aid $SO_2$ recovery in an acid plant and to reduce the offgas volumes.

During the 250 kg testwork, both coke breeze and oil were used together as fuels in varying proportions. In the final runs at 35% $O_2$, coke breeze additions up to 10 times the oil rate were used. Under these conditions, the furnace was over-coked and a stable foam approximately 100 mm thick formed on the bath surface. The foam did not cause problems and is not present when the furnace is correctly coked. The use of coke breeze as the sole fuel is preferred.

The fuel consumptions in coke equivalents during the trials at 35% $O_2$ were 90 kg coke breeze/dry tonne of Mix A and 100 kg coke breeze/dry tonne of Mix B, at 5% fume recycle and 15% moisture in the feed, after correcting for heat losses from the 250 kg rig. The furnace heat losses on the proposed plant are estimated to be a maximum of 0.5 MW which is equivalent to 110 kg of coke breeze per hour at 35% $O_2$.

The resultant fuel consumptions are 650 kg coke breeze/hr for Option 1 and 510 kg coke breeze/hr for Option 2.

The process gas at the top of the furnace, including 1 $Nm^3/s$ ingress air, is shown in Table 7 below:

TABLE 7

|  | Option 1 6 tonnes/hr Mix A | Option 2 4 tonnes/hr Mix B |
|---|---|---|
| $O_2$ | 9.4% | 11.7% |
| $N_2$ | 69.8% | 70.3% |
| $SO_2$ | 8.4% | 4.9% |
| $CO_2$ | 12.4% | 13.1% |
| TOTAL | 2.6 $Nm^3/s$ (dry basis) | 2.0 $Nm^3/s$ (dry basis) |

The spray water required to cool the gas to 200° C. is 1.5 liters/s for Option 1 and 1.1 liters/s for Option 2, giving total wet offgas volumes of 4.9 and 3.6 $Nm^3/s$ respectively.

A dedicated process gas baghouse with integral fume return system enables the fume to be recycled directly to the ISASMELT furnace at the same rate as it is produced. This stabilises the process by automatically correcting any excursions and thus improves metallurgical control. This is especially preferred for the lower lead slags of Option 1.

Pulse air plus ingress for a reverse pulse baghouse is estimated to be 0.2 $Nm^3/s$ for both Options 1 and 2. The gas volumes and $SO_2$ concentrations entering the acid plants will thus be 2.8 $Nm^3/s$ at 7.8% $SO_2$ and 2.2 $Nm^3/s$ at 4.5% $SO_2$ (both on a dry basis) for Options 1 and 2 respectively.

The fume rates during the 250 kg testwork were dependent upon the gas volume flushed through the bath. For lance air enriched to 35% $O_2$ the fume rate ranged from 5 to 10% by weight or the reed. Fuming tended to be slightly greater for Mix B material, in accordance with the higher PbO activity in the slag, but this difference was not significant at 35% $O_2$. On a full size plant the fume rate will be approximately 5% of the feed rate.

During the 250 kg testwork it was not possible to recycle the fume from the baghouse directly on the plant, instead the fume from previous runs was pelletized and added at the same rate as that measured at the baghouse.

As a result, the minor elements in the fume did not reach steady state except for antimony (Table 3). The steady state fume compositions are estimated as 0.4% Sb, 10% As, 1.5% Bi and 15% Cd for Mix A and 0.4% Sb, 10% As, 1.5% Bi and 20% Cd for Mix B.

Silver and gold in the fume did not reach steady state during the testwork. The steady state fume compositions are estimated as 8000 ppm Ag and 40 ppm Au for Mix A, and 5000 ppm Ag and 50 ppm Au for Mix B. Silver and gold were fully recovered once the fume was recycled.

The furnace may be either batch or continuously tapped, although due to the relatively low tonnages batch tapping is preferred to maintain reasonable slag flowrates and to minimize labour.

The holding capacity of a 1.8 m internal diameter furnace will allow 2.5 hours operation between taps for Option 1 and 4 hours for Option 2.

The slag may be either granulated or cast depending upon requirements.

Lance lives currently average 100 hour operating times.

The furnace is lined with chrome-magnesite wear bricks and based on current refractory lives a minimum period of one year is expected between rebricks.

Since the ISASMELT furnace is almost totally enclosed and a moist agglomerate feedstock is used good hygiene is likely to be achieved.

Although the invention has been described with reference to specific examples, it will be appreciated by those skilled in the art that the invention may be embodied in many other forms.

We claim:

1. A method for the treatment of a mixture of lead dusts and pyritic concentrates said method including the steps of:
   a) feeding a mixture of lead dust and pyritic concentrate to a furnace containing molten slag;
   b) smelting the mixture by injecting air or oxygen enriched air into the slag by means of a submerged lance to produce a lead bearing slag;
   c) recycling fume to the furnace; and
   d) periodically or continuously tapping the furnace to recover a lead containing slag.

2. A method for the treatment of lead dusts, without pyritic concentrate, said method including the steps of:
   a) feeding lead dust to a furnace containing molten slag;
   b) smelting the dust by injecting air or oxygen enriched air into the slag by means of a submerged lance to produce a lead bearing slag;
   c) recycling fume to the furnace; and
   d) periodically or continuously tapping the furnace to recover a lead containing slag.

3. A method in accordance with claim 1, wherein steps a), b) and c) are continuous.

4. A method in accordance with claim 1 wherein coal, coke, oil or natural gas, or any combination thereof, may be used as a fuel.

5. A method in accordance with claim 1 wherein flux is added to produce a fluid slag.

6. A method in accordance with claim 1 wherein the fume is recycled to the furnace via a baghouse.

7. A method in accordance with claim 6 wherein the baghouse is a dedicated unit with an integral fume return system.

8. A method in accordance with claim 1 wherein the preferred operating temperatures range from 1150° to 1125° C.

9. A method in accordance with claim 8 wherein the temperature is 1170° to 1190° C.

10. A method in accordance with claim 1 wherein the slag contains less than 2% sulphur and the process off-gas will have an $SO_2$ concentration of greater than 4% to aid $SO_2$ recovery at an acid plant.

11. A method in accordance with claim 1 wherein the slag has a composition in the range 20 to 50% Pb, 10 to 20% Fe, 5 to 15% $SiO_2$ and 2 to 5% CaO, with typical residual impurities of up to 10% Zn, 3% $Al_2O_3$ and 3% MgO.

12. A method according to claim 2, wherein the slag has a composition in the range 20 to 50% Pb, 10 to 20% Fe, 5 to 15% $SiO_2$ and 2 to 5% CaO, with typical residual impurities of up to 10% Zn, 3% $Al_2O_3$ and 3% MgO.

* * * * *